Figure 1:
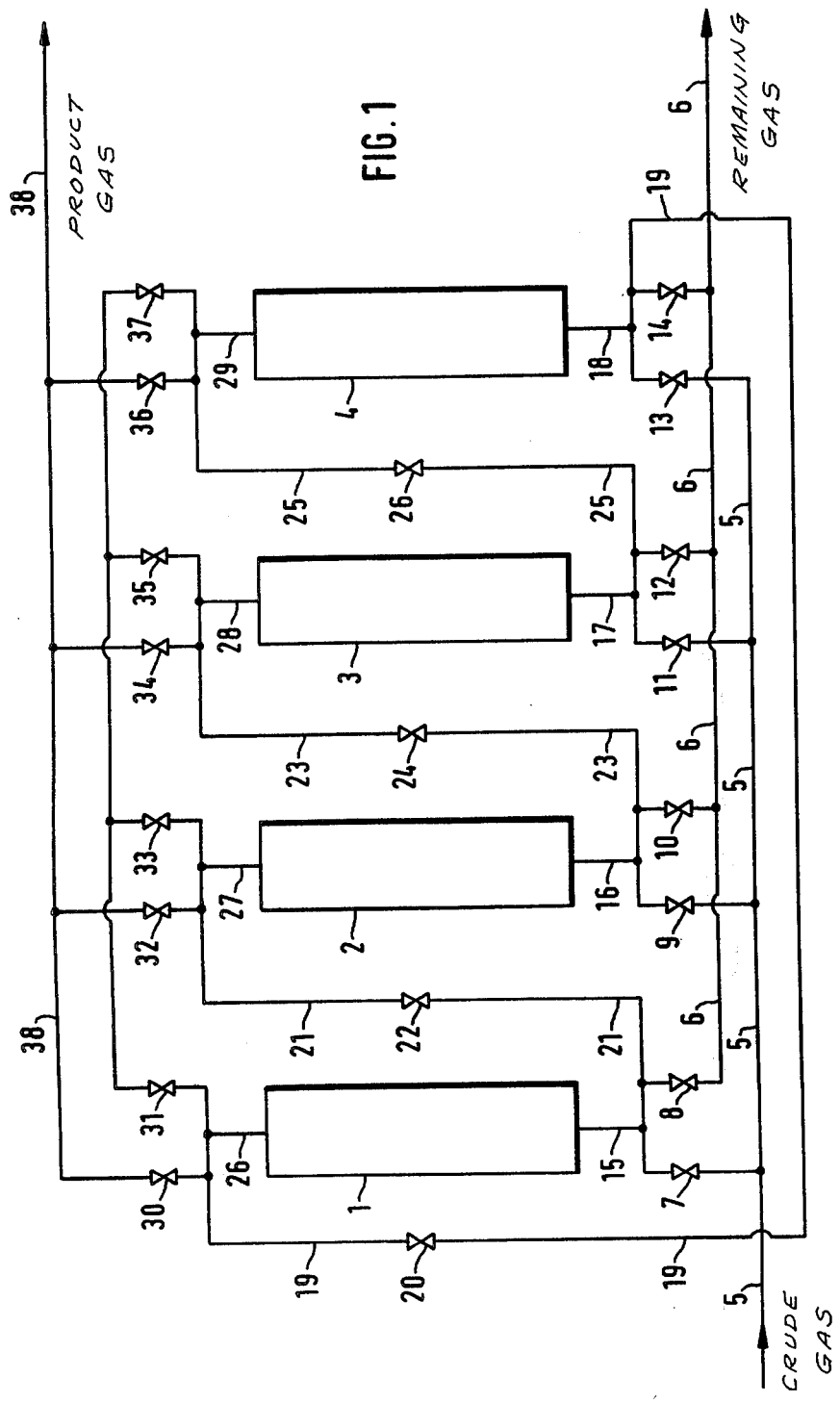

United States Patent [19]

Knoblauch et al.

[11] 4,404,004
[45] Sep. 13, 1983

[54] METHOD FOR SEPARATING GAS MIXTURES BY MEANS OF PRESSURE CHANGING ADSORPTION TECHNIQUE

[75] Inventors: Karl Knoblauch; Ekkehard Richter, both of Essen; Klaus Giessler, Gelsenkirchen; Werner Körbächer, Mühlheim, all of Fed. Rep. of Germany

[73] Assignee: Bergwerksverband GmbH, Essen, Fed. Rep. of Germany

[21] Appl. No.: 384,157

[22] Filed: Jun. 1, 1982

[30] Foreign Application Priority Data

Jun. 6, 1981 [DE] Fed. Rep. of Germany ....... 8122701

[51] Int. Cl.³ ............................................. B01D 53/04
[52] U.S. Cl. .......................................... 55/25; 55/58; 55/62; 55/68; 55/75
[58] Field of Search ................... 55/25, 26, 31, 34, 33, 55/57, 58, 59, 62, 68, 74, 75

[56] References Cited

U.S. PATENT DOCUMENTS

| 3,226,913 | 1/1966 | Avery | 55/25 |
| 3,252,268 | 5/1966 | Stark | 55/25 |
| 4,021,210 | 5/1977 | Streich | 55/62 |
| 4,070,164 | 1/1978 | Miwa | 55/58 |
| 4,077,779 | 3/1978 | Sircar | 55/62 |
| 4,153,428 | 5/1979 | Saunders | 55/62 |
| 4,171,207 | 10/1979 | Sircar | 55/26 |
| 4,299,596 | 11/1981 | Benkman | 55/62 |
| 4,315,759 | 2/1982 | Benkman | 55/25 |
| 4,350,500 | 9/1982 | Esselink | 55/58 |
| 4,371,380 | 2/1983 | Benkman | 55/26 |

FOREIGN PATENT DOCUMENTS 2460513 7/1976 Fed. Rep. of Germany ......... 55/25

Primary Examiner—Ernest G. Therkorn
Attorney, Agent, or Firm—Michael J. Striker

[57] ABSTRACT

A method using pressure adsorption techniques for separating individual gas components from gas mixtures on adsorption agents in which a gas mixture is fed under increased pressure onto and in contact with an adsorption agent layer maintained in a separation reactor wherein undesirable gas components are adsorbed and thereafter the product gas is discharged so that a subsequent build up of pressure to adsorption pressure takes place in the layer by gas flow in reverse direction with respect to the adsorption direction followed by a subsequent adsorption stage wherein in accordance with the invention the pressure relief and rinsing action are caused to occur in two stages using reverse direction of slow with respect to the direction of adsorption; the relief gas obtained from the first reverse flow pressure relief stage is used as a rinsing gas for the first rinsing stage; the relief gas obtained from the second reverse flow pressure relief stage is discharged as a remainder gas and the product gas is used as a rinsing gas for the second rinsing stage.

5 Claims, 2 Drawing Figures

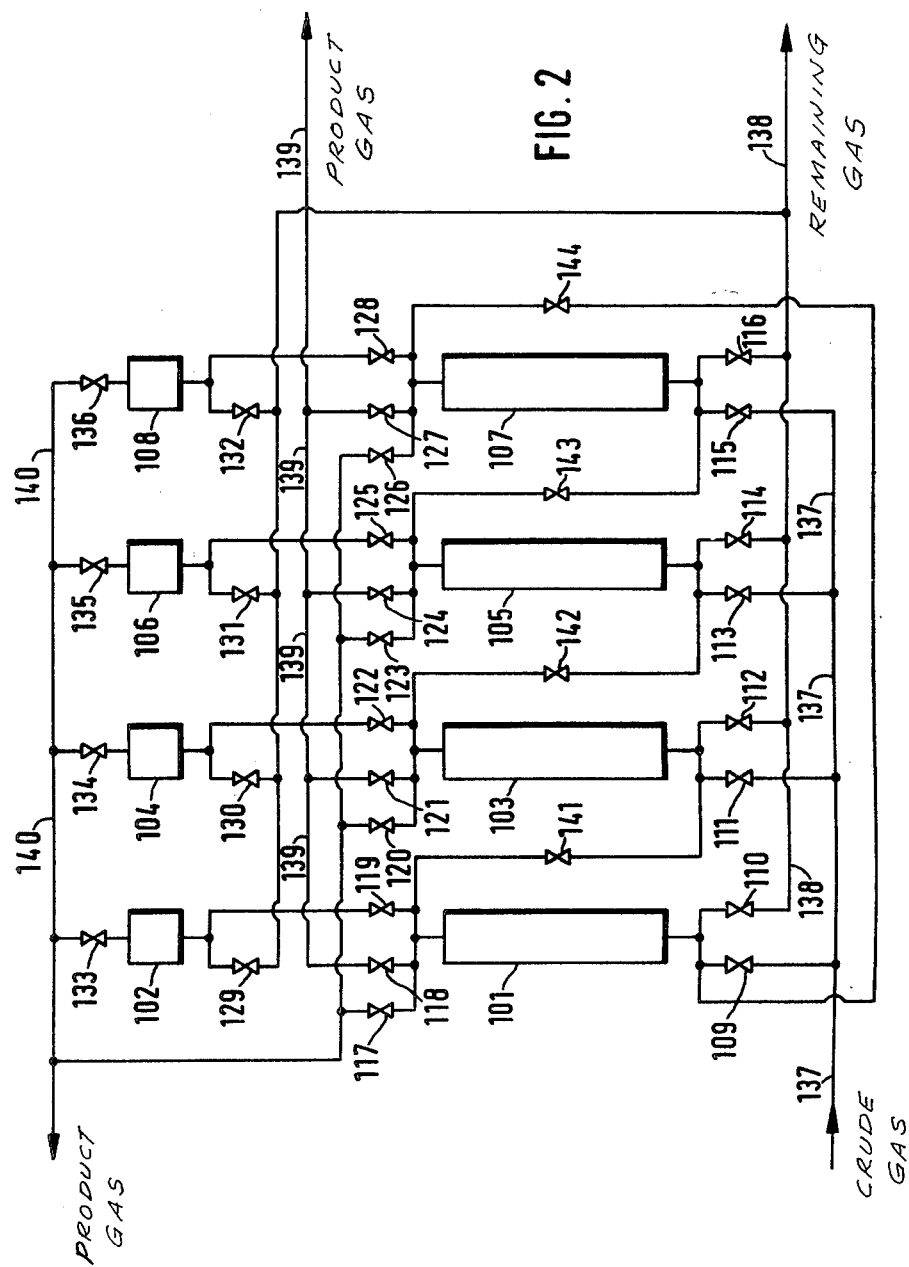

METHOD FOR SEPARATING GAS MIXTURES BY MEANS OF PRESSURE CHANGING ADSORPTION TECHNIQUE

The invention relates to a method for separating gas mixtures by means of a pressure changing adsorption technique.

When separating such gas mixtures which consist of at least two components, whereby at least one of the component is recoverable as a product gas it is customary when using the pressure changing and adsorption technique to operate a plurality of adsorption reactors parallel with respect to each other, so as to assure a gas separating and gas production process. Product gases are such which in comparison to the remainder of the gas components are adsorbed at a substantially lower degree with respect to the used adsorption agent. Accordingly, the method described here is not limited to specified gas mixtures or specified product gas components. The yield of production gas is limited in accordance with the aforementioned process in that relatively large quantities of product gas is used for rinsing purposes which, for example, result to more than 15% of the product gas quantity. This is particularly true when relatively fixed adsorbed gas components have to be removed during the adsorption regeneration (desorption) by means of pressure release and rinsing.

It is an object of the invention to increase the yield of product gas from the gas mixture to be separated. The solution of this object is based on the idea that in a two stage performed rinsing of the adsorption agent the first rinsing stage is at first operated with a gas mixture containing the which is of a poorer product gas quality than the product gas and better than the quality of the adsorbing gas mixture, for this purpose crude gas is suitable. Surprisingly, a yield increase is possible when the gas mixture is used for the first rinsing stage, which is generated in a first of at least two reverse flow release stages and it is further surprising that the inventive rinsing effect is practically as large as the one obtained with the rinsing exclusively with a product gas. The partially adsorbed rinsing gas after the first partially adsorption stage on the adsorption agent is displaced with the remainder of the adsorbed gas components by the product gas from the adsorption agent layer. It is to be understood that the first rinsing stage is finished at least when the partial pressure of the adsorbing components to be rinsed away from the adsorption agent is equal to that of the rinsing gas. Concerning the preferred embodiments of the invention attention is directed to the patent claims.

Due to the characterizing features of the process of the invention, a substantially lower consumption of product gas for the purpose of rinsing is obtained at an even production gas purity.

The finishing of the adsorption stage occurs preferably when the adsorption agent layer of the separating reactor is loaded with the undesirable gas components, so that the discharging product gas still has the required purity.

In principle, all the adsorption agents which have been hitherto used in this field of invention are used, including activated carbon, carbon molecular sieves, zeolite and the like.

The pressure and temperature conditions are within the framework which is usual in this type of invention.

The yield in accordance with the invention is to be understood to mean the relation of the quantity flow of the gas components which discharge as product gas, as far as it is not being used for rinsing and pressure restoring purposes, to the quantity flow of the gas components to be yielded in the crude gas which is fed to the installation.

The adsorption is preferably performed at a significant higher pressure than atmospheric pressure. Hence, it would be sufficient to perform the pressure release to about the atmospheric pressure and to rinse at this pressure. However, it is to be understood that the pressure release can be performed at a substantially lower pressure than atmospheric pressure by applying a vacuum, so that the rinsing is achieved at the obtained end pressure, whereby it is possible to perform the adsorption at atmospheric pressure.

A very good rinsing effect is obtained in the first reverse flow rinsing step when in accordance with claim 2 the release gas is exclusively used which discharges during 1/50 to ½ of the total release time.

When a further pressure release stage is switched in front of the two reverse flow pressure release stages in that the gas mixture which is adsorbed and present in the adsorption agent layer is at first discharged from the separating reactor during a short time in the direct flow with respect to the adsorption direction, a suitable release gas is available (claim 3), at least for the first pressure build up, preferably in the reverse flow. However, the discharging release gas in such a pre-switched direct flow pressure release stage can be fed immediately to a further adsorption agent layer in accordance with claim 4, which in principle is operated in the same manner as the adsorption agent layer in the separating reactor with the only difference that the throughflow and adsorption occurs at a lower pressure as the crude gas pressure and that this pressure occurs during the complete pressure release in the separating reactor by means of an intermediary pressure between the crude gas pressure and the remaining pressure. This mode of operation is particularly suitable at high crude gas pressures and a product gas which discharges at the end of the after adsorber is obtained which is suitable as a product gas for rinsing and pressure build up purposes.

The use of a prefilter which is switched in front of the separating reactor which, for example, may consist of an adsorption agent layer insures that in particular strong adsorbing gas components, like hydrocarbons with at least two C-atoms which frequently occur as traces of impurities in gas mixtures to be separated do not enter the separating reactor, thus considerably improving the service life of the adsorption agent (claim 5). The after adsorber in accordance with claim 4 as well as the prefilter in accordance with claim 5 as well as the separating reactor can be operated as the pressure change adsorber.

Further advantages and embodiments of the invention can be seen from the subsequent description of exemplified embodiments in accordance with the attached drawing. The drawing shows:

FIG. 1 the schematic illustration of a 4-adsorption installation, exclusively made from separating reactors;

FIG. 2 the schematic illustration of a 4-adsorption installation with separating reactors and after adsorbers In the following examples only a complete pressure change cycle is explained for a parallel switched adsorber, so that, for example, the opening or closing conditions of the associated valves relate only to the associated adsorber. The remaining adsorbers and their associated valves are then actuated in a corresponding manner with a timely displacement. Naturally, all of the embodiments can be operated with a single adsorber, if need be, with an after adsorber, as far as suitable intermediary storages are available for the different gas flows.

EXAMPLE 1

A 4-adsorber installation in accordance with FIG. 1 was operated in the following manner:

Crude gas flows through a collector line 5, valve 7 and line 15 through the separating reactor 1 which at the beginning of the adsorption phase is filled with product gas. The product gas to be yielded flows at the end of the separating reactor through line 26 and valve 30 into the product gas line 38. The adsorption phase is interupted at least at a point when the defined purity of the product gas is lowered below a defined value in light of breaking through undesirable gas components. For this purpose, valves 7 and 30 are closed. Relief gas flows from the separating reactor in a first reverse flow pressure relief stage through a line 21 and an opened throttle valve 22 into the separating reactor 2 which heretofore had been relieved to a remaining gas pressure. There the mentioned relief gas rinses the adsorption agent in the reverse flow method within the separating reactor 2. Thereby, a remaining gas which is strongly loaded with the undesirable gas components is discharged by the separating reactor 2 by means of line 16 and valve 10 into the remaining gas line 6. This phase is finished when a predetermined time has passed or when the pressure in the separating reactor 1 has fallen below a predetermined value. Thereafter, the pressure is released at closed valve 22 and opened valve 8 within the separating reactor 1 in the reverse flow with respect to the adsorption direction by means of remaining gas line 6 until the remaining gas pressure is reached. Thereafter, the first reverse flow rinsing stage is carried out in the separating reactor 1 with the relief gas from the first reverse flow relief stage from separating reactor 4. Thereby, this rinsing gas flows through line 18/19 at opened valve 20 through the separating reactor 1 and discharges therefrom through the remainder gas line. At the conclusion of this first reverse flow rinse stage valve 20 is closed and at opened valve 30 the product gas flows in reverse direction through the separating reactor 1 and discharges through the remainder gas line. The subsequent pressure build up in the separating reactor 1 is performed after closing valve 8 by means of product gas in reverse flow until the adsorption pressure is reached.

All other separating reactors go through the same stages as described with respect to the timely displacement concerning the cycle of separating reactor 1. By means of this switched 4 absorption installation the following exemplified embodiment was realized.

Each of the separating reactors with a diameter of 0,1 m was filled with with one each 0,025 m$^3$ hydrocarbon molecular sieve. These are cylindrical shaped particles with a length of 4 mm and a diameter of 2 mm. The specific surface in accordance with Brunauer, Emmet and Teller is about 1,100 m$^2$/g. The crude gas is composed of 60 Vol.-% H$_2$,1,3 Vol.-% CO$_2$,7 Vol.-% N$_2$,6 Vol.-% CO and 25,7 Vol.-% CH$_4$. The adsorption pressure was 17 bar, the end pressure at rinsing was was 1 bar. The temperature was ambient temperature. During the adsorption stage 10,6 m$^3$/h were fed into the separating reactor (gas volumes are valid under normal conditions), so that 5,29 m$^3$/h of product gas are recovered. The adsorption phase lasted 300 seconds. During the first reverse flow pressure relief stage with a duration of 20 seconds,470 l relief gas are recovered from the separating reactor with a mean composition of 51,7 Vol.-% H$_2$,14 Vol.-% CO$_2$,10,5 Vol.-% N$_2$,9,2 Vol.-% CO and 27,2 Vol.-% CH$_4$. This gas is used for rinsing another separating reactor in the reverse flow up to 1 bar. In the second reverse flow pressure relief stage with a duration of 280 seconds the pressure reduction was lowered to the remaining gas pressure of 1 bar. The total remainder composition from the second reverse flow pressure release stage and the subsequent rinsing stages with the the reverse flow pressure release gas and with the product gas was 20,15 volume.-% H$_2$,2,6 volume-% CO$_2$,13,97 volume -% N$_2$,11,98 volume -% CO and 51,3 volume -% CH$_4$. Accordingly the resulting product gas yield was 83,2%.

EXAMPLE 2

At first the adsorption took place in the the separating reactor 1, whereby crude gas was fed through line 5, valve 7 and line 17 within the separation reactor which at the beginning of the adsorption is filled with product gas at crude gas pressure. At the end of the separating reactor 1 pure product gas did flow into the product gas line 38 by means of line 26 and valve 30. Before traces of the undesirable gas components reached the adsorber exit the adsorption was finished in that valves 7 and 30 were closed. Thereafter, a three step pressure relief occured by a first direct current pressure relieve stage, in the adsorption direction, wherein a gas, which primarily contains only product gas by means of valve 31 and 35, is fed in reverse flow separating reactor 3 being rinsed at a remaining pressure and until it reaches a predetermined pressure increase to a maximum pressure equalisation between the separating reactor 1 and the separating reactor 3. Thereafter, the valve 31 was closed and valve 22 was opened, so that in a first reverse flow pressure relief stage relaxing gas was fed in a reverse flow at an opened valve 10 while the relaxing gas was just finished through line 21 and adsorber 2, so that the gas was at a relaxing gas pressure and that the rinsing gas was fed into the remaining gas line 6. This relaxing stage was finished after a predetermined time after the pressure in the separating reactor 1 has reached a predetermined value. Thereafter the valve 22 was closed and valve 8 was opened so that in the second pressure relaxing stage the relaxing gas is discharged directly into the remaining gas line 6.

Two reverse flow rinsing stages are subsequent to the pressure relief at first with a relaxing gas from the first reverse flow pressure relief stage of the separating reactor 4 through line 19 at opened valve 20, while the reverse flow rinsing gas was fed through the opened valve 8 into the remainder gas line 6. Thereafter, the valve 20 was closed and valve 30 was opened so that product gas could flow through the separating reactor 1 at opened valve 8 for the second reverse flow rinsing stage and was discharged through the remaining gas line 6. The subsequent pressure build up was carried out at two stages in reverse flow direction in that at first pressure release gas flows directly into the separating reactor 1 from separating reactor 3 at closed valve 8 and opened valves 35 and 31. Subsequently the remaining pressure build up is carried out at closed valve 31 and opened valve 30 with product gas from line 38. Thus a complete pressure change cycle was completed and at an opened valve 7 a new adsorption stage could start. The other separating reactors go through the same stages as described in separating reactor 1, only with a time displacement. In such a switched 4-adsorber installation the following gas separating process was carried out.

Four like separating reactors with a 0.10 m diameter were filled with with 0,025 m$^3$ of a hydrocarbon molecular sieve made of cylindrically shaped particles with a length of 4 mm and a diameter of 2 mm as well as a specific surface in accordance with Brunauer, Emmet and Teller of 1.100 m$^2$/g. As a crude gas a mixture of 60 volume-% H$_2$,1,3 volume-% CO$_2$,7 volume-% N$_2$, 6 vol.-% CO and 25,7 volume -% CH$_4$ at a pressure of 17 bar were fed through the separating reactors and were recovered at their ends as a product gas hydrogen with a purity of 99,9%. During the adsorption stage 10 m$^3$/h (gas volume under normal condition) were fed into the separating reactor thus recovering 5,05 m$^3$/h of product gas. The adsorption phases lasted for about 1,200 seconds. During the subsequent pressure relief the pressure was lowered in the respective separating reactor from 17 to 15,7 bar in a first reverse flow pressure relief and the released relaxing gas was used for the reverse flow rinsing of yet another separating reactor. In the second reverse flow pressure relief stage the pressure reduction was carried out at the remaining gas pressure of 1 bar. The total remaining gas composition from the second counter current relaxation stage and the two subsequent rinsing stages, the second with product gas, was 2,63 volume-CO$_2$,14,4 volume -% N$_2$,19,19 volume -% H$_2$, 12,12 volume -% CO and 54,92 volume -%CH$_4$ at a remainder gas volume flow of 4,95 m$^3$/h. Consequently, the resulting product gas yield was 84,2%.

EXAMPLE 3

This exemplified embodiment was carried out in a 4-adsorption installation with after adsorbers in accordance with FIG. 2. The mode of operation for a separating reactor with after adsorber is explained in the following:

Crude gas which at least has one component to be separated from the desired product gas is present, for example, under increased pressure between 10 and 35 bars. A product gas A is generated with a reduced pressure in the installation parts, while the remaining gas is recovered at the end of the pressure relief stage and during the rinsing stage with a considerably less pressure which usually is at a range of more than 1 bar, as long as no vacuum desorption is carried out. The product gas B which discharges from the after adsorbers is yielded at a pressure which is between the pressures of the remaining gas and the product gas A. At the beginning of a pressure change cycle of separating reactor 101 it is filled with a product gas at a crude gas pressure, while the after adsorber 102 is at a remaining gas pressure in the rinsed stage. The separating reactor 101 is admitted from the crude gas line 137 through valve 109. The undesired component (s) is (are) retained in the adsorption agent of the separating reactor, so that the product gas flows into the product gas line 139 through valve 118.

During this time the pressure of the remaining gas in the after adsorber 102 is increased to the pressure of product gas B, in that product gas is fed from the product gas line 140 through valve 133 into this adsorber. These operating stages in the separating reactor 101 and the after adsorber 102 are finished before any negligible traces of the undesired components can discharge at the end of the separating reactor 101. Thereafter the separating reactor 101 is pressure released in three steps.

In the first stage the gas leaving the separating reactor 101 which discharges the gas mixture in reverse flow by means of valve 144 is used for rinsing the separating reactor 107 whose released was heretofore finished. After closing valve 144, valve 119 is opened and in the second (direct flow) relaxation stage a gas mixture flows through the after adsorber 102 which contains only such gases which are hardly adsorbed next to the non-adsorbable gases. The latter is at a pressure of product gas B. In this pressure level the adsorbable components are separated from the second relaxation stage in the after adsorber 102 from the separating reactor 101, so that during this phase only product gas reaches the product gas line 140. This phase is interupted when the components of the gas components to be separated reach a too high value in the gas mixture.

The following stages within the framework of the cylindrical operation occur without a direct change effect for the separating reactor 101 and the after adsorber 102, so that the are separately described in the following. They separating reactor 101 is released to the remaining gas pressure in the counter current method during the third relaxing stage by means of valve 110. Thereafter it is rinsed with gas from the first releasing stage from the separating reactor 103 in a first rinsing stage at opened valves 141 and 110 flowing in the reverse direction. Thereafter, it is rinsed with product gas B from product gas line 140 at opened valves 117 and 110 in the reverse flow method. The pressure build up in the separating reactor 101 is performed in two stages always in the reverse flow method. In the first stage product gas B is pushed out of line 140 through valve 117 into the separating reactor 101 up to a pressure close to product gas B. In the second stage the pressure is increased to the pressure of product gas A, in that product gas A from line 139 is fed from line 139 through valve 118 into the separating reactor 101. Thereafter a new pressure change cycle starts for the separating reactor 101 with the adsorption of crude gas. Until this reverse switching point the stages relaxing and rinsing with product gas must be concluded in the adsorber 102. The release starts after finishing the adsorption which is identical with the finishing of the second release stage of the separating reactor 101. The gas mixture which is released during the reverse flow release flows through valve 129 into the remaining gas line 128. After the finishing of the relaxation to remaining gas pressure the after adsorber 102 is rinsed with product gas B, whereby this gas comes from the product gas line 140 and through valve 133. The after adsorber 102 and the valve 129 are taking the path into the remaining gas line 138. After a predetermined time the rinsing gas is finished and a new cycle is started with the reverse flow current pressure build up for the after adsorber 102. It is not necessary that the finishing of the pressure build up in the separating reactor 101 coincides with the finishing of the rinsing in the after adsorber 102.

The cyclic operation of the other separating reactors and after adsorbers is done in analogous manner

EXAMPLE 4

The pressure change adsorption installation contains four even separating reactors with a 0,10 m diameter and a volume of 0,25 m³ as well as four like after adsorbers with a diameter of 0,10 m and 0,1 m³ adsorption volume. They are filled with a hydrocarbon molecular sieve of cylindrically formed particles with a length of 4 mm and a diameter of 2 mm as well as a specific surface in accordance with Brunauer, Emmet and Teller of 1.100 m²/g. As a crude gas a gas mixture was used composed of 60 volume-% $H_2$, 1,3 volume-% $CO_2$, 7 volume -% $N_2$, 6 volume -% CO and 25,7 volume -% $CH_4$. The adsorption pressure in the separating reactor was 17 bar, the adsorption pressure in the after adsorbers is 8 bar and the remaining gas pressure is 1 bar. The temperature was ambient temperature. During the adsorption stage 10,6 m³/h (gas volume under normal conditions) are fed into the separating reactor and thereby 5,45 m³ hydrogen are recovered with a purity of 99,9%. The adsorption phases in the separating reactors lasted about 1,200 seconds. In the following pressure release a gas mixture did discharge from the separating reactor 101 in the first reverse flow stage for 10 seconds with the following composition: 48,1 volume -% $H_2$, 1,6 volume -% volume-% $CO_2$, 9,4 volume -% $N_2$, 8,0 volume -% CO and 32,9 volume -% $CH_4$. This is used in the separating reactor 107 for the first rinsing stage. In the second direct flow relaxation stage the gas mixture flows from the separating reactor 101 into the after adsorber 102 with the following composition: about 0,1 volume-% $CO_2$, 32,2 volume-% $N_2$, 27,0 volume-% CO and 22,3 volume -% $CH_4$. In the third relaxition stage a gas mixture discharges during the direct flow relaxation from the separating reactor into the remainder gas line with the composition of 12 volume-% $H_2$, 2,8 volume-% $CO_2$, 12,7 volume-% $N_2$, 11,8-volume-% CO and 60,7 volume-% $CH_4$. The gas mixture which is fed from the following two rinsing stages from the separating reactor into the remainder gas line contains at a pressure of 1 bar, 18,7 volume-% $H_2$, 4,8 volume-% $CO_2$, 2,4 volume-% $N_2$, 2,0 volume-% CO and 72,1 volume-% $CH_4$.

The after adsorbers are operated at a pressure of 7 bar during the adsorption. During the relaxation and rinsing with product gas a gas mixture with a composition of 25,6 volume-% $H_2$, 33,3 volume-% $N_2$, 25,4 volume-% CO and 15,7 volume-% $CH_4$ is generated.

The total remaining quantity from the separating reactors and the after adsorbers is 5,15 m³/h. The remaining gas has the following composition: 17,8 volume -% $H_2$, 2,7 volume-% $CO_2$, 14,1 volume -% $N_2$, 12,4 volume -% CO and 53,5 volume-% $CH_4$. The hydrogen yield is 85,8%.

We claim:

1. A method using pressure adsorption technique for separating individual gas components from gas mixtures or adsorption agents in which a gas mixture is fed under increased pressure onto an adsorption agent layer in a separation reactor wherein undesirable gas components are adsorbed and thereafter the product gas is discharged whereby a subsequent build up of pressure to adsorption pressure takes place in the layer by gas flow in reverse direction with respect to the adsorption direction followed by a subsequent adsorption stage which comprising:
    (a) causing the pressure release and rinsing action to occur in two stages using reverse direction of flow with respect to the direction of adsorption;
    (b) using the relief gas obtained from the first reverse flow pressure relief stage as a rinsing gas for the first rinsing stage;
    (c) discharging the relief gas obtained from the second reverse flow pressure relief stage as a remainder gas; and
    (d) using the product gas as a rinsing gas for the second rinsing stage.

2. Method in accordance with claim 1 characterized in that the first reverse flow and pressure relief stage takes 1/50 to ½ of the total relief time.

3. Method in accordance with claim 1 or 2, characterized in that a reverse flow pressure relief step is switched in front of the two reverse flow pressure relief steps and that the discharging relief gas is used for pressure restoring purposes.

4. Method in accordance with claims 1 or 2, characterized in that a direct flow pressure relief stage is switched in front of two reverse flow pressure relief stages and that the discharging relief gas is fed directly to a further adsorption agent layer wherein the undesirable gas components are adsorbed and at which end the product gas discharges.

5. Method in accordance with any of claims 2-4 and 1, characterized in that especially strong adsorbing gas components are separated in a prefilter switched in front of the separating reactor.

* * * * *